Feb. 18, 1936.  J. D. ZAHM ET AL  2,031,520

TRAP

Filed Sept. 29, 1932  2 Sheets-Sheet 1

Joseph D. Zahm
John U. Lehn  INVENTORS

BY Louis Prevost Whitaker
ATTORNEY

Feb. 18, 1936. J. D. ZAHM ET AL 2,031,520
TRAP
Filed Sept. 29, 1932 2 Sheets-Sheet 2
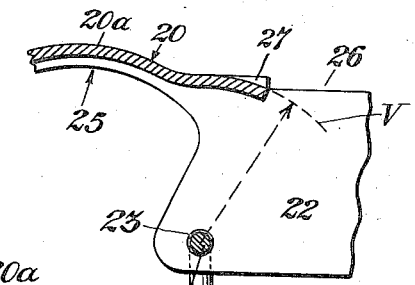
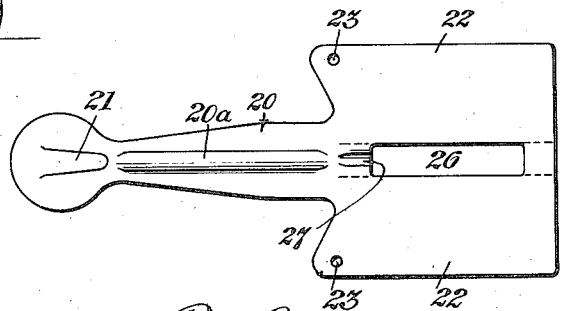
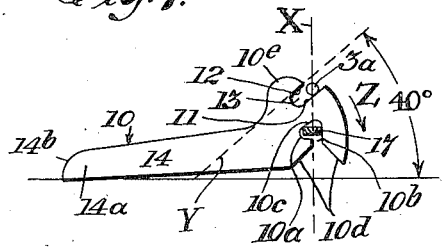
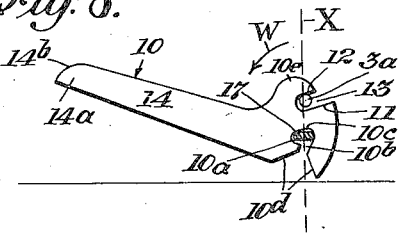
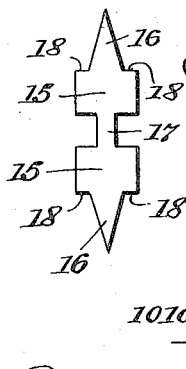
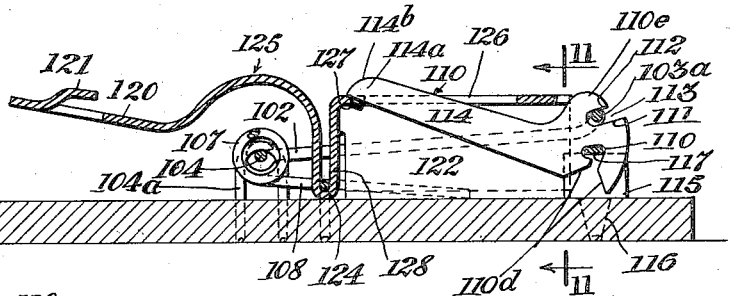
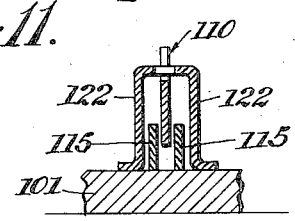
INVENTORS
Joseph D. Zahm and
John U. Lehn
BY
Louis Prevost Whittaker
ATTORNEY Patented Feb. 18, 1936

2,031,520

UNITED STATES PATENT OFFICE 2,031,520

TRAP

Joseph D. Zahm and John U. Lehn, Lititz, Pa., assignors to Animal Trap Company of America, Lititz, Pa., a corporation of Pennsylvania Application September 29, 1932, Serial No. 635,327

11 Claims. (Cl. 43—83)

Our invention consists in the novel features hereinafter described, reference being had to the accompanying drawings, which shows the best form in which the invention has been embodied, and a slight modification thereof, selected by us for purposes of illustration, and the said invention is fully disclosed in the following description and claims.

The object of our invention is to provide a very cheap and efficient trap intended primarily for mice, rats and other small animals, which will be automatically set by simply swinging the striker or jaw from the released to the set position.

Referring to the said drawings,

Fig. 5 is a detail sectional view of a portion of the bait pedal.

Fig. 5a is a view similar to Fig. 5 showing a slight modification.

Fig. 6 is a plan view of the bait pedal and counterweight flattened out.

Fig. 7 is a diagrammatic view illustrating the relative positions of the locking blade, its pivot and the striker, when the latter is swung over into initial engagement with said locking blade.

Fig. 8 is a similar view showing the parts in "set" position.

Fig. 9 is a plan view of the staple for pivotally supporting and guiding the locking blade, showing it in flattened position.

Fig. 10 is a view similar to Fig. 4, showing a slightly modified embodiment of our invention.

Fig. 11 is a vertical transverse sectional view on line 11—11 of Fig. 10.

Figure 1:
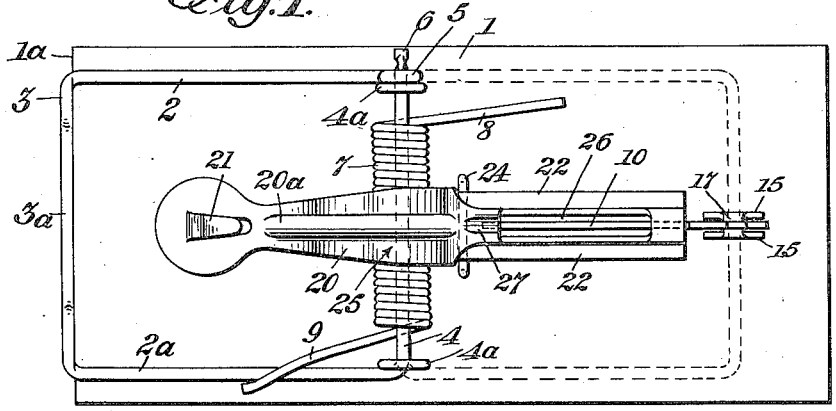
Fig. 1 is a plan view of a trap embodying our invention showing it in the released position.

Referring to Figs. 1 to 9 inclusive, 1, represents the trap base which is preferably made of wood of oblong or other shape, and of the desired thickness. The jaw or striker and its pivot shaft are preferably made of one piece of suitable wire or rod, and comprise the arms, 2, 2a, connected by cross bar, 3, one of the arms, as 2a, being integral with the pivot portion, 4, the outer end of which extends through an eye, 5, formed at the inner end of the other arm, as 2, and upset as at 6, or otherwise provided with means for retaining it in engagement with the eye, 5. The cross bar, 3, of the striker is intended to lie just beyond the forward end, 1a, of the base, and is provided with a downwardly offset central portion, 3a, which in the released position of the trap extends below the upper surface of the base.

The striker is provided with a suitable spring, preferably a single coil, as 7, through which the pivot member, 4, is passed before it is inserted in and secured with relation to the eye 5. The spring coil, 7, terminates at one end in an arm, 8, engaging the base, and at the other end in a similar arm, 9, which engages one arm, as 2a, of the striker or jaw. The pivot member 4, is connected with the base, preferably by driving a staple, 4a, into the base between each end of the coil, 7, and the adjacent arms, 2 or 2a, the closed ends of the staples loosely embracing the pivot member and serving as bearings therefor, while at the same time preventing undue lateral movement of the striker and spring coil.

At the rear end of the base, 1, is located a pivotally mounted locking device which, in conjunction with a pivoted and counterweighted bait pedal, holds the striker in set position. The locking device is in the form of a pivotally mounted blade indicated as a whole at 10, and held in vertically disposed or on edge position by a novel form of staple shown in detail in flattened position in Fig. 9. This staple is formed of sheet metal and comprises two substantially rectangular plate portions, 15, each provided with a point or tang, 16, said plates being connected centrally at their adjacent edges by an integral pivotal portion, 17, which is oblong in cross section, that is of greater width than thickness. The plate portions of the staple are bent into parallelism as shown, and are separated sufficiently to enable the locking blade, 10, to be inserted freely between them, while serving to guide the blade in its pivotal movements. The staple is secured in position by driving its tangs or points, 16, into the base, and these points are of less width than the plates, 15, so that the portions of the lower edges of the plates indicated at 18, will act as stop shoulders which engage the upper surface of the base and determine the extent to which the points can be driven in. The pivotal portion, 17, is preferably at such a height above the base that no part of the blade can come into contact with the upper surface of the base, which might otherwise cause the blade to bind. The position of the pivot portion, 17, above the base is therefore accurately determined by simply driving in the staple until the stop shoulders, 18, engage the base. This is important in accurately assembling the parts of the trap as the improper location of the pivot of the locking device may easily result in an imperfect trap, and this construction, while extremely cheap, simple and efficient, insures absolute accuracy in the height of the pivot, 17.

The position of pivot, 17, longitudinally of the trap with respect to the striker is also very important. The cross bar, 3a, of the striker when in set position should be substantially directly above the center of pivot, 17, or very slightly in rear of said center as indicated by dotted lines X in Figs. 7 and 8, and must never be forward of said center. There is a slight lost motion permitted to the striker in swinging it back to set position due to the width of the staples, 4a, loosely engaging the cross bar, 4. This blade supporting staple must therefore be so placed that the cross bar, 3a, of the striker when in set position can never be forward of the center of pivot, 17, as this would tend to prevent the locking blade from properly engaging the trigger of the bait pedal, and also tend to prevent the release of the striker. In other words, the lost motion of the striker with respect to its pivot must carry the cross bar, 3a, to the rear of line X and not forward of it. This lost motion, which is present in most mouse and rat traps, will perform a desirable function in our trap, in that when the trap is being set, if the locking blade should accidentally be in operative engagement with the bait pedal trigger the lost motion, which can only extend rearwardly will permit the cross bar, 3a, of the striker to engage the cam portion, 10e, of the blade which is in substantially vertical alignment with the axis of the pivot, 17, when the blade is in set position, so as to press it in a forward direction. The blade being held from movement by its engagement with the trigger when in set position, this pressure reacts on the cross bar, 3a, and the lost motion in the pivotal connection is sufficient to permit the striker to shift rearwardly and allow the cross bar, 3a, to pass over the portion 10e, of the locking blade, above the slot, 13, and enter the slot and operatively engage the edge, 12, which forms the detent.

Figure 3:
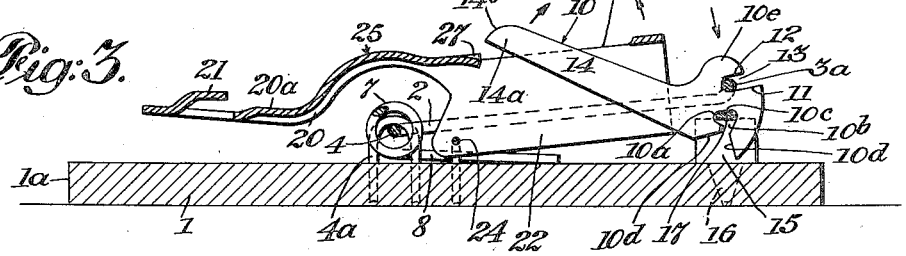
Fig. 3 is a central longitudinal vertical section of the trap showing the position of the parts when the striker or jaw is swung over into engagement with the locking means, and depressed to rock the locking blade.
Figure 4:
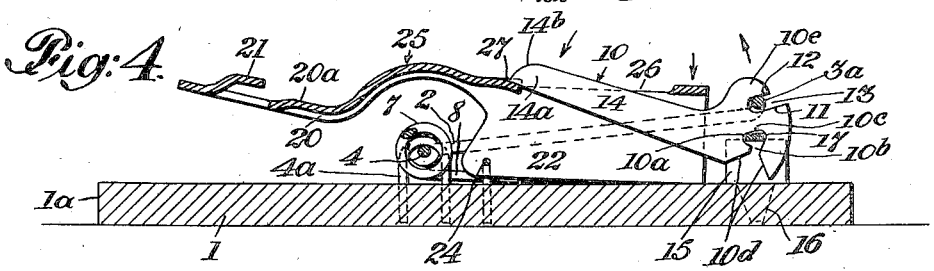
Fig. 4 is a view similar to Fig. 3, showing the trap set.

The locking blade is provided with a pivotal aperture, 10a, of sufficient length longitudinally of the blade to freely engage the pivot, 17, and with a slot, 10b, extending therefrom to the bottom edge of the blade, portions of which slot adjacent to the pivotal aperture, 10a, are of less width than the greater diameter of the pivot, but sufficiently wide to accommodate the thickness or lesser diameter of the pivot. This construction enables the parts to be readily assembled, but when assembled in connection with the pivotal portion, 17, of the staple, and the staple is inserted in the base, it is impossible for the blade to be removed from engagement with its pivot, 17, accidentally or otherwise. The lower part of the slot is preferably made of gradually increasing width to provide converging guiding edges, 10d, as shown which facilitate assembling. The upper edge of the pivot aperture, 10a, is preferably inclined upwardly and rearwardly, as indicated at 10c, to permit the blade to rock backward to the desired extent, which will bring the edge, 10c, into substantial parallelism with the upper face of the pivot, 17, and serve as a stop to prevent further movement. Above the pivot aperture, 10a, the blade, 10, is provided with a slot, 13, having an upwardly and rearwardly inclined lower edge, 11, forming a lever portion to be engaged by the striker, in setting the trap, above and parallel to which edge, 11, is a shorter overhanging edge, 12, forming a locking shoulder or detent, separated from the edge, 11, by the width of the slot, or recess, 13. The blade is also provided with a long forwardly extending arm, 14, having at its outer end a locking portion, 14a, rounded on its upper edge, as at 14b. In the normal or released position of the trap the arm, 14, has its locking portion, 14a, resting on the upper surface of the base, and in this position the cross bar, 3a, of the striker if swung over into nearly the set position, will clear the detent, 12, but will engage the edge 11 below the same at a point directly over the pivot, 17, and thus tilt the blade so as to raise the locking portion into engagement with the bait pedal hereinafter described, and bring the detent, 12, into locking position above the cross bar, 3, of the striker, as shown in Fig. 3. We also prefer to make the depth of the slot, 13, such that when the cross bar, 3a, of the striker engages the lower edge, 11, and rocks the blade into the position just described the inner end of the slot will engage the cross bar, 3a. This provides an additional stop for the locking blade, to that furnished by the engagement between the pivot portion, 17, and the edges of the pivotal aperture in the blade relieving the pivot from strain and preventing the blade from being tilted too far and unduly raising the rear end of the bait pedal, which might otherwise result in the blade dropping back onto the base before the trigger portion of the bait pedal is in position to engage it, in which case the trap would not be set.

The angle of the edges, 11 and 12, of the slot, 13, is very important. This slot, 13, receives the cross bar, 3a, of the striker in setting the trap and in the set position the cross bar is pressed upwardly against the edge, 12, so as to tend to rock the blade in the direction indicated by the arrow, W, in Fig. 8. The correct position of the cross bar with respect to the pivot, 17, of the blade in the set position is substantially directly above the center of the pivot or slightly in rear thereof. It must never occupy a position forward of the center of pivot, 17. It follows therefore that if the edge, 12, is too near a horizontal position, when the trap is set the upward push of the cross bar, 3a, would be entirely transferred to and taken up by the pivot, 17, and the blade would not release the striker, when its arm, 14, is released by the bait pedal. On the other hand if the edge, 12, is too nearly vertical the upward pressure of the striker would cause the arm, 14, to bear too heavily on the bait pedal trigger, and make the trap hard to release. We have found by extensive experimentation that by making the edge, 12, at such an angle that in the released position (see Fig. 7) said edge will be at an angle of 40° to the plane of the base indicated by the dotted line Y, Fig. 7, the best results are secured, and further the slight variations in the position of the cross bar, 3a, due to the lost motion between the pivot, 4, and the bearing staples, 4a, heretofore referred to will be accommodated and will not be permitted to interfere with the correct operation of the trap. The lever edge, 11, is preferably parallel, or substantially parallel to the detent edge, 12.

The bait pedal is preferably stamped up from sheet metal and comprises a bait carrying arm, 20, which is provided with a longitudinal pressed or struck up rib, 20a, to reinforce it. The arm, 20, is preferably provided at its forward end with a struck up bait holding lug or point, 21, and at its opposite end the arm, 20, is provided with a counterweight portion formed by laterally extending wing portions, 22, which are bent downwardly from the central portion into approximate parallelism, and are provided preferably at their lower forward corners with pivot apertures, 23, to engage the cross bar of a wide staple, 24, driven into the base and forming the pivotal support for the bait pedal. The pivotal apertures, 23, may be formed as the inner ends of open slots, 23a, extending vertically therefrom as shown in Fig. 5a to facilitate assembling the pedal and the cross bar of staple, 24, in which case the contiguous portions of the wings, 22, are made coaxial with the cross bar of the staple as indicated at 22a. The staple, 24, is located in rear of the striker pivot and spring, 7, and the reinforced arm, 20, of the bait pedal is curved over said spring and pivot, as shown at 25. The wings, 22, serve as a counterweight for the bait pedal and rest on the base in the released position of the trap, and enclose the arm, 14, of the blade, 10. The central portion of the bait pedal between the wings, 22, is provided with a longitudinal slot, 26, to accommodate the blade arm, 14, and at the forward end of said slot is a trigger portion, 27, for engaging the arm, 14, of the locking blade. This trigger portion is preferably formed by making a slight longitudinal depression or groove as shown, the bottom surface of which forms the trigger and is curved coaxially with the pivotal axis of the bait pedal. This is clearly shown in Fig. 5, in which the arc of the trigger is indicated at V, and is coaxial with the pivot portion, 24. It will be seen that when the trap is set and the arm, 14, of the locking blade is pressed downward upon the curved trigger, 27, by the engagement of the striker cross bar, with the edge, 12, the rocking of the bait pedal to release the locking blade and spring the trap will not raise the arm, 14, with the consequent depressing of edge, 12, against the resistance of the striker spring, as would otherwise result, making the trap harder to release. On the contrary the trigger pulls out from beneath the arm, 14, without raising it thus greatly facilitating the release of the striker. It has been found by experiment that by curving the trigger substantially coaxially with the pivotal axis of the bait pedal, the trap can be released by about one half the amount of pressure on the pedal, which is otherwise necessary, thus making the trap more sensitive. While we prefer to form the curved trigger, 27, substantially coaxial with the pivot of the bait pedal so that it will not tend to raise the arm, 14, in releasing the said arm, it is obvious that the trigger can be so curved as to slightly lower the arm, 14, as it is being released within the scope of our invention.

Figure 2:
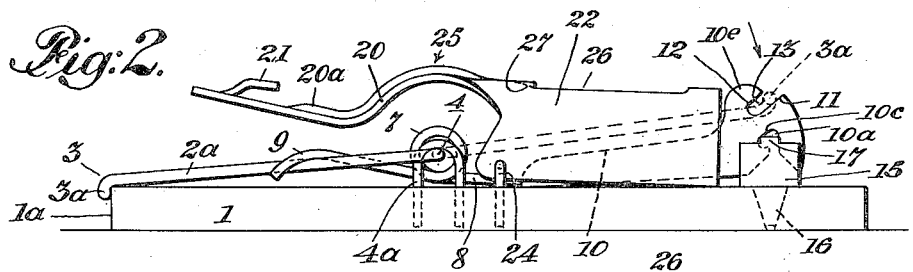
Fig. 2 is a side elevation of the trap showing in dotted lines the position of the striker when swung over into engagement with the locking blade but before depressing it sufficiently to rock the locking blade.

To set the trap, the striker or jaw is swung over its pivot and the cross bar, 3, is brought into engagement with the edge, 11, of the blade, 10, as shown in dotted lines, Fig. 2, and is pressed downwardly as indicated in Fig. 3, in the direction of the arrow, Z, in Fig. 7. This rocks the blade, 10, on its pivot, bringing the detent, 12, above the cross bar, 3a, and raising the arm, 14, of the blade. The upper curved surface of the arm, 14, engages the trigger portion, 27, of the bait pedal, and tilts the latter, allowing the arm, 14, to pass up through the slot, 26, when the weight of the wings, 22, rocks the bait pedal rearwardly and places the curved trigger portion, 27, beneath the arm, 14. The trap is thus automatically set and the striker when released by the hand will be firmly locked by the detent, 12.

The slightest depression of the bait holding arm, 20, of the bait pedal will tilt the bait pedal forward, and withdraw the curved trigger, 27, from engagement with the arm, 14, without raising it, and said arm will instantly drop through the slot, 26, permitting the blade, 10, to be rocked on its pivot, 17, and withdrawing the detent, 12, from engagement with the cross bar, 3, and the trap is sprung.

In Figs. 10 and 11 we have shown a slightly modified form of our invention, in which the parts similar to those described with reference to Figs. 1 to 9 are given the same reference numerals with the addition of 100. In this construction the wing portions, 122, constituting the counterweight, are carried rearwardly and brought into substantial parallelism, so as to have a guiding engagement with the plate portions, 115, of the rear staple. The bait pedal also has its central portion bent downwardly at the forward ends of the wing portions, 122, and then upwardly to form a staple engaging portion, 128, instead of forming pivotal apertures in the wings for this purpose. The remaining parts are as previously described and the operation is identical.

What we claim and desire to secure by Letters Patent is:

1. In an automatically set trap, the combination with a base, a spring actuated striker pivotally mounted thereon, of a pivotally mounted locking blade provided with a detent portion, a lever portion to rock said blade into set position, and a forwardly extending trigger engaging arm, of a pivoted bait pedal having a curved trigger portion against which said arm is pressed by the spring actuated striker in the set position, the curvature of said trigger being such as to permit of the release of said arm, without moving it against the action of the spring actuated striker.

2. In an automatically set trap, the combination with a base, a spring actuated striker pivotally mounted thereon, of a pivotally mounted locking blade provided with a detent portion, a lever portion to rock said blade into set position, and a forwardly extending trigger engaging arm, of a pivoted bait pedal mounted on a separate pivot in rear of the pivotal mounting of the striker, and having a trigger portion curved substantially coaxially with the pivotal axis of the bait pedal to permit the release of said arm without moving it against the action of said spring actuated striker.

3. An automatically set trap comprising a base, a spring actuated striker, a locking blade provided with a pivotal aperture, a bait treadle having a trigger portion for engaging said blade, and a pivotal support for said blade comprising parallel guiding plates on opposite sides of said blade, having their lower ends secured to said base and their upper ends connected by a pivotal portion adapted to pass through said pivotal aperture.

4. An automatically set trap comprising a base, a spring actuated striker, a locking blade provided with a pivotal aperture, a bait treadle having a trigger portion for engaging said blade, said blade having a slot extending from the pivotal aperture to an edge of the blade, and a pivotal support for said blade comprising parallel guiding plates, having at their lower edges attaching points for securing them to the base, and having their upper edges united by a horizontally disposed integral pivot portion, adapted to pass through said slot and engage the pivotal aperture in the blade.

5. An automatically set trap comprising a base, a spring actuated striker, a locking blade provided with a pivotal aperture having unequal diameters, and a slot of less diameter than the major diameter of said aperture extending therefrom to an edge of the blade, a bait treadle having a trigger portion for engaging said blade, and a pivotal support for said blade comprising parallel guiding plates having at their lower edges points for securing them to the base and having their upper edges united by a horizontally disposed integral pivot portion having unequal diameters, slightly less than the corresponding diameters of said aperture, the minor diameter of said pivot portion being sufficiently less than that of said slot to permit the pivot portion to pass through said slot into said pivotal aperture.

6. An automatically set trap, comprising a base, a spring actuated striker, a locking blade provided with a pivotal aperture having unequal diameters, and a slot having a portion of less diameter than the major diameter of said aperture, extending downwardly to the bottom edge of said blade, a bait treadle having a trigger portion for engaging said blade, and a pivotal support for said blade comprising parallel guiding plates having at their lower edges points for securing them to the base, and having their upper edges united by a horizontally disposed integral pivot portion having unequal diameters for engaging said aperture, the major diameters of said aperture and said pivot portion being substantially horizontal, and the minor diameter of said pivot portion permitting it to pass through said slot.

7. An automatically set trap comprising a base, a spring actuated striker, a locking blade provided with a pivotal aperture having unequal diameters, and a slot of less diameter than the major diameter of said aperture extending therefrom to an edge of the blade, a bait treadle having a trigger portion for engaging said blade, and a pivotal support for said blade comprising parallel guiding plates having at their lower edges points for securing them to the base and having their upper edges united by a horizontally disposed integral pivot portion having unequal diameters, slightly less than the corresponding diameters of said aperture, the minor diameter of said pivot portion being sufficiently less than that of said slot to permit the pivot portion to pass through said slot into said pivotal aperture, each of said plates being provided with horizontally disposed shoulders adjacent to the inner ends of said points for engaging the upper face of the base, and positioning the pivot part with respect thereto.

8. In an automatically set trap the combination with a base, of a spring actuated striker provided with a cross bar, and having a loose pivotal connection with the base, of a locking blade pivotally connected to said base, and provided with a forwardly extending trigger engaging arm and a rearwardly extending detent portion located substantially directly above the axis of the pivotal connection of the blade, and a pivotally mounted bait pedal having a trigger portion to extend beneath the said arm of the blade, the detent portion of the blade having a cam portion coacting with the cross bar of the striker to move the striker bodily rearward, and permit the cross bar to engage beneath the detent, in setting the trap with the blade in operative relation with the trigger.

9. In an automatically set trap the combination with a base, of a spring actuated striker having a loose pivotal connection with the base permitting lost motion of the striker longitudinally of the base, of a locking blade pivoted to said base, and provided with a rearwardly extending detent portion, substantially directly above the pivot of the blade, a rearwardly extending lever portion below the detent, and a forwardly extending trigger engaging arm, the pivotal axis of said blade being so located as to prevent the striker from engaging the said detent forward of the pivotal axis of the blade, said detent having its lower face disposed at such an angle as to insure the downward movement of said trigger engaging arm by the striker when the trap is sprung, and a bait pedal formed of sheet metal and provided with a bait holder forward of the axis of the striker, and a portion extending rearwardly of the pivotal connection of the striker and provided with downwardly extending counterbalancing wings on opposite sides of said blade, said wings being provided with pivotal apertures, said bait pedal having a curved trigger portion at the forward end of the slot, curved coaxially with the axis of said pivotal apertures, and a pivot connected with said base extending through said apertures in said wings and located in rear of the pivotal connection of the striker.

10. An automatically set trap comprising a base, a spring actuated striker, a locking blade provided with a pivotal aperture, a bait treadle, a trigger connected to the treadle for engaging said blade, and a pivotal support for said blade comprising parallel guiding plates on opposite sides of said blade, having their lower ends secured to said base and their upper ends connected by a pivotal portion adapted to pass through said pivotal aperture.

11. In a trap of the class described having a base, a spring actuated striker member attached to the base, a locking blade over said base, and a bait treadle having a trigger for engaging said blade; a pivotal support for said blade comprising two parallel guiding plates rising rigidly from said base on opposite sides of said blade, and a pivot portion connecting the upper ends of said plates, said blade having an opening through which said pivot portion passes.

JOSEPH D. ZAHM.
JOHN U. LEHN.